United States Patent [19]

Lucas et al.

[11] 4,309,329

[45] * Jan. 5, 1982

[54] AQUEOUS DRILLING FLUID ADDITIVE

[75] Inventors: James M. Lucas; Alphonse C. Perricone; Dorothy P. Enright, all of Houston, Tex.

[73] Assignee: Milchem Incorporated, Houston, Tex.

[ * ] Notice: The portion of the term of this patent subsequent to May 19, 1998, has been disclaimed.

[21] Appl. No.: 131,328

[22] Filed: Mar. 18, 1980

Related U.S. Application Data

[63] Continuation-in-part of Ser. No. 946,227, Sep. 27, 1978, abandoned.

[51] Int. Cl.³ ............................................. C08L 33/02
[52] U.S. Cl. ......................... 260/29.6 TA; 252/8.5 C; 526/240
[58] Field of Search ................ 526/240, 303; 525/329, 525/369; 260/29.6 TA

[56] References Cited

U.S. PATENT DOCUMENTS

| | | | |
|---|---|---|---|
| 2,552,775 | 5/1951 | Fischer et al. | 526/240 |
| 3,726,812 | 4/1973 | Higashimura et al. | 526/240 |
| 3,758,449 | 9/1973 | Hoppe et al. | 525/369 |
| 3,764,530 | 10/1973 | Burland et al. | 526/240 |
| 3,970,633 | 7/1976 | Miller et al. | 526/240 |

*Primary Examiner*—Harry Wong, Jr.
*Attorney, Agent, or Firm*—William C. Norvell, Jr.

[57] ABSTRACT

The invention relates to an aqueous solution of a filtration control agent for utilization in said aqueous drilling fluid, useful in a method of forming a filter cake on the wall of a well for the reduction of filtrate from said drilling fluid, which is effective at high temperatures and pressures, the terpolymer consisting essentially of: (1) an alkali metal acrylate units; (2) hydroxyalkyl acrylate units; and (3) acrylamide.

8 Claims, No Drawings

AQUEOUS DRILLING FLUID ADDITIVE

CROSS-REFERENCE TO RELATED APPLICATION

This application is a continuation-in-part application of co-pending application Ser. No. 946,227, filed Sept. 27, 1978, now abandoned, entitled "Aqueous Drilling Fluid Additive, Composition And Process", and assigned to the same assignee as this application.

BACKGROUND OF THE INVENTION

1. Field of the Invention

The invention relates to the a terpolymer of: (1) a monovalent alkali metal salt of acrylic acid; (2) an hydroxy alkyl acrylate; and (3) acrylamide useful, to effectively reduce the filtrate loss of an aqueous drilling fluid used in the drilling of a subterranean well.

2. Description of the Prior Art

It is generally agreed among those skilled in the art that a rotary system is a most acceptable form of drilling an oil or gas well. This system depends upon the rotation of a column of drill pipe to the bottom of which is attached a multi-pronged drilling bit. The bit cuts into the earth causing the cuttings to accumulate as drilling continues. As a result, a drilling fluid must be used to carry these cuttings to the surface for removal, thus allowing the bit to continue functioning and the bottom hole to be kept clean and free of cuttings at all times. Drilling systems other than the rotary system are sometimes employed during drilling operations. Nevertheless, these systems still require a drilling fluid to remove the bore hole cuttings and to otherwise perform functions related to drilling fluids.

Oil-producing formations are generally porous layers having varying degrees of permeability to the flow of fluids such as oil, water, or gas. Consequently, the rate of oil production is largely determined by the rate of flow through these permeable formations which, in turn, is dependent upon the porosity or permeability of the sand or stone present. In drilling through such a porous layer, it is desirable to employ a drilling mud having such characteristics that excessive amounts of liquids or solids are prevented from penetrating the porous formation. The ability of the drilling mud to prevent excessive formation fluid penetration is called filtration control.

Materials that have been used in the past to control filtration rates of aqueous drilling fluids by plugging, producing cakes, or similar methods, have included materials such as pre-gelatinized starch, sodium carboxylmethylcellulose, sodium polyacrylates, and lignites. Each of these materials have certain limitations. For example, lignite becomes ineffective in high salt concentrations.

Acrylic and methacrylic derivatives, such as those which are co-polymerized with hydrocarbon substituted styrenes, such as alpha methyl styrene, para methyl styrene, 2-4 dimethyl styrene, and the like have been utilized in drilling fluids. For example, U.S. Pat. No. 2,718,497, to Oldham, et al, teaches the use of relatively high molecular weight polymers of these materials to control water loss characteristics of aqueous muds and clay dispersions. Additionally, U.S. Pat. No. 2,650,905, to Fordyce, et al, teaches the use of water soluble sulfonated polystyrene derivitives for filtration control in water-based drilling fluids.

The prior art has utilized acrylic acid derivitives as thickeners for numerous commercial purposes, including utilization in drilling fluids. For example, U.S. Pat. No. 4,059,552, to Zweigle, et al, teaches the use of acrylamide-sodium acrylate or acrylic acid-substituted acrylates. A similar thickening material is disclosed in U.S. Pat. No. 4,037,035, to Blanc, et al, by utilization of an acrylamide-sodium acrylate constituent with an acrylamide-acrylic acid alkanolamine. Similarly, copolymers of acrylamide and sodium acrylate and acrylate derivitives thereof formed by irradiation polymerization are utilized as thickeners, as disclosed in U.S. Pat. No. 3,926,756 to Restaino. U.S. Pat. No. 3,897,404 to Korte, et al, teaches utilization as thickeners for printing paste and the like of substituted acrylamide-acrylic acid-acrylate derivatives.

Hydrophilic gels derived from 2-hydroxyethyl methacrylate have been found to be useful in a number of medical applications as material for gel filtration, such as copolymers of acrylamide, acrylic ester-2-hydroxyethyl methacrylate, as disclosed in U.S. Pat. No. 3,948,841, to Dusek.

Acrylamide-sodium acrylate-2-hydroxyethyl acrylate crosslinked agents of a comparatively high molecular weight are utilized as soil stabilizers as disclosed in U.S. Pat. No. 3,651,002, to Higashimura, et al.

Acrylic acid derivitives such as copolymers of acrylamide and sodium acrylate derivitives have been frequently and commercially utilized as flocculants for drilling fluids, and are disclosed in U.S. Pat. No. 3,558,545, and No. 3,472,325 to Lummus. Similarly, a copolymer derived from acrylic acid and acrylamide is disclosed in U.S. Pat. No. 3,323,603 to Lummus et al, as a flocculant for aqueous drilling fluids.

In the present invention, enhanced filtration control is obtained by incorporation into an aqueous drilling fluid of a filtration control agent consisting essentially of a terpolymer of: (1) a monovalent alkali metal salt of acrylic acid; (2) an hydroxy alkyl acrylate; and (3) acrylamide. Although it is not fully understood, it is believed that the terpolymer will produce a filter cake along the bore hole to maintain effective filtration control during circulation of the drilling fluid within the well.

It is an object of this invention to provide a filter cake which is substantially unaffected by comparatively high bore hole temperatures and pressures.

It is a further object of this invention to provide a filtration control agent which will not materially affect the viscosity of the utilized drilling fluid system.

It is a further object of this invention to provide a comparatively low cost, easily prepared, filtration control agent for use in aqueous drilling fluids.

It is a further object of this invention to provide a filtration control agent for aqueous drilling fluids which is comparatively insensitive to salt environments and concentrations within the aqueous system.

It is a further object of this invention to provide a filtration control agent which may be utilized in highly weighted drilling fluids.

Other objects and advantages of the present invention will be easily appreciated by those skilled in the art from a reading of the description, examples and claims which follow.

SUMMARY OF THE INVENTION

The present invention provides a filter cake-producing substance which is effective at high temperatures and is comparatively insensitive to salt environments and concentrations found in aqueous drilling fluids by utilization of a terpolymer of: (1) a monovalent alkali metal salt of acrylic acid; (2) an hydroxy alkyl acrylate; and (3) acrylamide.

DESCRIPTION OF THE PREFERRED EMBODIMENTS

The preparation of the terpolymer of the present invention incorporates three monomeric materials, which are: (1) a monovalent alkali metal salt of acrylic acid; (2) an hydroxy alkyl acrylate; and (3) acrylamide.

Any monovalent alkali metal salt of acrylic acid, such as the sodium, potassium, or cesium salt, may be utilized as a starting monomeric additive for preparation of the present filtration control agent. Di- and tri-valent salts have been found to be comparatively unacceptable because of their inherent precipitation characteristic when incorporated into aqueous systems. Additionally, acrylic acid variatives, such as methacrylic acid salts, are not acceptable for use in the practice of the present invention because their comparative solubility parameters are significantly less in aqueous systems than that of the aforementioned acrylic acid water soluble salts. Additionally, since the acrylic acid derivitives set forth above are comparatively highly water soluble in aqueous environments, their copolymerization activity is enhanced during the preparation reaction for the filtration control agent of the present invention.

Although any monovalent alkali metal salt of acrylic acid may be successfully utilized in the preparation of the filtration control agent of the present invention, the sodium salt of acrylic acid is preferred.

Varying amounts of monovalent alkali metal salt of acrylic acid, as selected, may be incorporated into the preparation of the terpolymer filtration control agent. It has been found that an amount of the selected monovalent alkaline metal salt of acrylic acid between a minimum of about 5 mole percent of the total composition of all monomeric materials and a maximum of about 62 mole percent may be utilized. When utilizing the sodium salt of acrylic acid, a preferred and satisfactory terpolymer filtration control agent may be prepared by incorporating therein about 23 mole percent of sodium acrylate.

The terpolymer of the present invention also utilizes as an initial constituent an hydroxy alkyl acrylate which is incorporated in order to provide hydrogen bonding between chains incorporating a carboxyl group and to provide a bulkier polymer end product. Additionally, the utilization of an hydroxy alkyl acrylate also enhances the viscosity of the terpolymer and renders it less sensitive to adverse effects of heavy salt concentrations, such as those found in aqueous brine solutions encountered as a base constituent of an aqueous drilling fluid. Also, by incorporating the hydroxy alkyl acrylate material into the terpolymer, good hydrogen-bonded crosslinking can be achieved between the chains which will aid in resisting salt sensitivity of the resultant terpolymer material.

Numerous hydroxyalkyl acrylates may be utilized, such as hydroxyalkyl acrylate and 3-hydroxyalkyl acrylate such as 2-hydroxyethylacrylate, 2-hydroxybutyl acrylate or, preferably, 2-hydroxypropyl acrylate.

The amount of the selected hydroxyalkyl acrylate for utilization in the composition of the present invention will vary, but a satisfactory end product may be made by incorporating therein a minimum of about 2.1 mole percent of hydroxyalkyl acrylate. A satisfactory end product also may be produced by utilizing up to a maximum of about 40 mole percent of hydroxy alkyl acrylate. Preferably, when 2-hydroxypropylacrylate is selected as the hydroxy alkyl acrylate, it has been found that about 4.0 mole percent of 2-hydroxypropylacrylate may be utilized.

The third monomer for utilization in the terpolymer composition for use in the present invention is acrylamide, which has been found to have a certain electrolyte reaction when incorporated into the terpolymer utilized in the present invention. Although not fully understood, it is believed that the acrylamide monomer when polymerized with the other constituents of the terpolymer will act as a dispersant of carboxyl groups on the resultant polymeric chain. Although methacrylamide may be substituted for the acrylamide monomer of the present invention, it has been found that it is less tolerant of the heavier concentrations of salt solutions and environments and is less water soluble than the acrylamide. Therefore, the acrylamide monomer has been found to be more acceptable for use in general in the present invention.

In our testing, we have found that a minimum of acrylamide monomer of about 31 mole percent may be incorporated into the terpolymer to obtain a satisfactory end product. A maximum amount of about 91 mole percent of acrylamide may also be incorporated to achieve a satisfactory terpolymer. However, we prefer to utilize about 73 mole percent of acrylamide in the preparation of a preferred composition for use in the present invention.

The terpolymer of the present invention may be prepared using a variety of known techniques. For example, emulsion, suspension or bulk polymerization techniques may be utilized.

The terpolymer is further characterized in that a 0.2 percent by weight aqueous solution of said terpolymer has a viscosity at about 25° C. of from between about 6 centipoises and about 85 centipoises, as determined at a shear rate of 511 reciprocal seconds.

As an effective filtration control agent, the terpolymer may be added to any aqueous base drilling fluid at the drilling or rig location in an amount from between about 0.25 p.p.b. to about 5 p.p.b. (pounds per 42 gallon barrel). The amount needed will vary, of course, depending upon the particular type of aqueous drilling fluid utilized, such as brine, sea water, or the like, the weight of the given drilling fluid, the clayey substances or clayey materials appearing therein, and the presence and amount of other chemical additives, such as lignosulfonate deflocculants, and the like. Simple and commercially available testing techniques may be easily utilized at the well site to determine the amount of filtration control additive which must be added to the circulatable drilling fluid to provide effective filtration control in the subterranean well. Because of the loss of material in the well, such as through adsorption onto the surface of the drilled solids and the like, it may be necessary to incrementally add additions of the terpolymer to the drilling fluid from time to time to maintain the required concentration.

A measure of the ability of the drilling fluid to form a thin impervious compressible filter cake may be determined by utilization of a simple filtration test in which the filter cake is formed and pressed against the membrane or filter which is permeable to water. A standardized procedure for determining the filtration rate is described in "API Recommended Practice RP 13 B Standard Procedure for Testing Drilling Fluids," 2nd Edition (April 1969).

The preparation and use of the terpolymer to control filtrate in an aqueous drilling fluid is further described in the examples which follow:

EXAMPLE I.

A terpolymer of sodium acrylate-2-hydroxypropyl acrylate and acrylamide was prepared utilizing an emulsion polymerization process. The mole ratios of acrylic acid to acrylamide, mole percent of 2-hydroxypropyl acrylate and molecular size were varied by controlling the reaction parameters. Six representative samples of the terpolymer were prepared with the compositions of the various terpolymers being estimated based upon their total nitrogen content. In the reaction, ammonium persulfate was utilized as the polymerization initiator or catalyst. Reagent grade acetone and reagent grade anhydrous methanol were utilized to form the solvent. The emulsifier was sodium lauryl sulfate, and 2 N aqueous sodium hydroxide was utilized to neutralize the reactants. The dried products were thereafter milled and passed through a number 30 mesh screen. The reaction was conducted over a period of three hours at a reaction temperature of about 60° C.

The six polymers prepared by this technique and the varying amounts of monomers and reagents are given in the table below, together with the resultant product yield for the terpolymer.

milliliters. The tubes were stoppered, shaken vigorously to disperse the terpolymer and heated in a steam bath for about 10 minutes. Thereafter, the tubes were cooled to room temperature, shaken to disperse the terpolymer, and centrifuged at 1800 rpm for about 20 minutes using an International Clinical Centrifuge which was equipped with a head having an 8.5 cm radius of gyration. The volume of the swollen terpolymer was measured as the difference between the total volume of 13 milliliters and the volume of the supernatant. The volume of the unswollen polymer was measured utilizing isopropyl alcohol as the non-solvent.

The criteria for measuring the degree of swelling for the samples was based upon the application of q as a criterian for measurement of the chemical potential of an electrolyte in a given solvent containing a given amount of electrolyte which is based upon theoretical models developed by Flory, in "Principles of Polymer Chemistry", (Cornell University Press, 1953) and by Hildebrand, in "Regular and Related Solutions" (Van Hostrand Reinhold Company, 1970) which explains the unique solubility of a polymer in various solvents.

The results given in Table 2, below, indicate that the polymer samples No. 2 and 3 of Example I were soluble in aqueous solutions which are saturated with various salts, while polymer Nos. 1, 4, 5 and 6 were somewhat precipitated by excess amounts of calcium ion. These tests indicate that these polymers have potential application as filtration control agents exposed to high salt environments.

TABLE 1

| Polymer No. | Units | Acrylic Acid | 2-(hydroxy propyl) Acrylate | Terpolymer Preparation Acrylamide | $(NH_4)_2S_2O_8$ | Sodium Lauryl Sulfate | Water | Yield g | % |
|---|---|---|---|---|---|---|---|---|---|
| 1 | g* | 89.0 | 18.0 | 43.0 | 1.00 | 7.00 | 608 | 157 | 88 |
|   | M* | 1.61 | 0.18 | 0.79 | $5.2 \times 10^{-3}$ | $30 \times 10^{-3}$ |  |  |  |
| 2 | g | 46.0 | 10.0 | 88.0 | 1.00 | 7.00 | 808 | 149 | 97 |
|   | M | 0.67 | 0.08 | 1.29 | $4.6 \times 10^{-3}$ | $24 \times 10^{-3}$ |  |  |  |
| 3 | g | 46.0 | 10.0 | 88.0 | 0.60 | 10.00 | 608 | 132 | 86 |
|   | M | 0.84 | 0.10 | 1.63 | $3.4 \times 10^{-3}$ | $43 \times 10^{-3}$ |  |  |  |
| 4 | g | 89.0 | 18.0 | 43.0 | 0.60 | 10.00 | 1061 | 105 | 59 |
|   | M | 1.17 | 0.13 | 0.57 | $2.5 \times 10^{-3}$ | $31 \times 10^{-3}$ |  |  |  |
| 5 | g | 72.00 | 14.0 | 69.0 | 1.20 | 4.00 | 968 | 107 | 61 |
|   | M | 1.03 | 0.11 | 1.00 | $5.4 \times 10^{-3}$ | $14 \times 10^{-3}$ |  |  |  |
| 6 | g | 75.0 | 28.5 | 72.0 | 0.40 | 4.00 | 1180 | 157 | 78 |
|   | M | 0.88 | 0.19 | 0.86 | $1.5 \times 10^{-3}$ | $11 \times 10^{-3}$ |  |  |  |

*g - grams
*M - mole/kg

EXAMPLE II.

The present example was conducted to determine the effect of exposure of various types and concentrations of inorganic salts to selected terpolymers made as in Example I, above. Polymer samples No. 2 and No. 3 of Example I, which contained a mole ratio of 2-to-1 of acrylamide-to-acrylic acid, were soluble in various aqueous-saturated salt solutions, while those polymer samples having a smaller mole ratio were precipitated by excess amounts of calcium ion.

The effect of the selected salt concentrations on the given polymer samples was determined by using swelling tests. The procedure for the swelling tests incorporated utilization of a 15 milliliter centrifuge tube which was charged with 0.50 grams of the selected dry terpolymer which was powder-milled to pass through a No. 30 mesh screen. The tube also was charged with water or the selected aqueous solutions containing varying amounts of one of the salt samples. The total volume in the tube for each sample material was 13

TABLE 2
DEGREES OF SWELLING, q, VERSUS IONIC STRENGTH OF AQUEOUS SALT SOLUTIONS

| Salt | Salt conc. mole/kg M | Ionic Strength mhom kg[1] | Terpolymer Number 1 | 2 | 3 | 4 | 5 | 6 |
|---|---|---|---|---|---|---|---|---|
|  |  |  | Degree of Swelling, q |  |  |  |  |  |
| $H_2O$ | 0 | 0 | gel | gel | gel | gel | gel | gel |
| $CaSO_4$ | 0.01 | 0.04 | — | gel | gel | 20 | gel[2] | gel |
| $CA(OH)_2$ | 0.02 | 0.06 | gel | gel | gel | gel[2] | gel[2] | gel |
| KCl | 4.02 | 4.02 | 7 | gel | gel[2] | 10 | 8 | 11 |
| $MgSO_4$ | 1.21 | 4.84 | 9 | gel | — | 8 | gel[2] | 11 |
| NaCl | 6.00 | 6.00 | 7 | gel[2] | 8 | 12 | 12 |  |
| $CaCl_2$ | 2.04 | 6.12 | 2 | gel | gel[2] | 2 | 8 | 7 |

[1] $S = \frac{1}{2} \Sigma (MV^2)$, V is valence of ion.
[2] Gel formed with some swollen polymer particles suspended in solution.

EXAMPLE III.

The filtration control effectiveness of the terpolymer samples prepared as in Example I, together with a sample of a commercially available filtration control agent generically described as a polyanionic cellulose (hereinafter referred to as "P.A.C.") were tested in a 22 p.p.b. Wyoming Bentonite 3% sodium chloride suspension and also in a 15 p.p.b. attapulgite-saturated sodium chloride suspension. The filtration control test was the API test as referred to above. The terpolymer and P.A.C. samples were sifted into barrel equivalents of muds while shearing at moderate speed on an electric mixer after which shearing was continued for thirty minutes. Thereafter, the samples were hot rolled at 150° F. for about 16 hours and thereafter cooled to room temperature, before flow properties and API filtrate properties were determined.

The results of this test clearly indicated that the terpolymer samples were effective in reducing the filtrate, when compared to a sample of each drilling fluid containing no filtration control additive.

The results of this test are set forth in the tables below:

TABLE 3
FLOW AND FILTRATION CHARACTERISTICS OF 22 ppb WYOMING BENTONITE 3% NaCl SUSPENSION TREATED WITH EXAMPLE I TERPOLYMERS

| | Fann 35 Rheology, Room Temperature | | | | | | | | | |
|---|---|---|---|---|---|---|---|---|---|---|
| | 600 | 300 | 200 | 100 | 6 | 3 | IG | 10G | pH | API Filtrate |
| 0.5 ppb Sample 1 | 52 | 40 | 34.5 | 28 | 18 | 17 | 12 | 42 | 9.0 | 16.0 |
| 1.0 ppb Sample 1 | 52 | 38 | 33 | 25 | 10 | 9 | 3 | 18 | 8.5 | 9.5 |
| 0.5 ppb Sample 2 | 44 | 25 | 19 | 13 | 3 | 2.5 | 3 | 11 | 8.2 | 13.0 |
| 1.0 ppb Sample 2 | 71.5 | 42 | 32 | 21 | 4 | 4 | 4 | 7 | 8.3 | 8.7 |
| 0.25 ppb Sample 3 | 46.5 | 38 | 35 | 31 | 28 | 26 | 28 | 28 | 8.1 | 19.9 |
| 0.5 ppb Sample 3 | 70 | 52 | 46 | 39 | 26 | 19 | 18 | 49 | 8.4 | 10.6 |
| 1.0 ppb Sample 3 | 76 | 63 | 56 | 46 | 36 | 29 | 22 | 69 | 8.3 | 7.2 |
| 0.5 ppb Sample 4 | 52 | 36 | 32 | 26 | 16 | 16 | 10 | 47 | 8.3 | 15.3 |
| 1.0 ppb Sample 4 | 50 | 36 | 32 | 26 | 13 | 13 | 8 | 44 | 8.4 | 9.2 |
| 0.25 ppb P.A.C. | 55 | 47 | 43 | 37 | 24 | 23 | 21 | 26 | 8.2 | 18.8 |
| 0.5 ppb P.A.C. | 75 | 63 | 57 | 48 | 29 | 28 | 28 | 47 | 8.1 | 11.0 |
| Blank | 46 | 39 | 36 | 32 | 22 | 22 | 20 | 15 | 8.3 | 32.5 |

TABLE 3B
FLOW AND FILTRATION CHARACTERISTICS OF 15 ppb ATTAPULGITE CLAY SATURATED NaCl SUSPENSION TREATED WITH TERPOLYMER SAMPLES OF EXAMPLE I.

| | Fann 35 Rheology, Room Temperature | | | | | | | | | |
|---|---|---|---|---|---|---|---|---|---|---|
| | 600 | 300 | 200 | 100 | 6 | 3 | IG | 10G | pH | API Filtrate, ml |
| P.A.C. | | | | | | | | | | |
| 1 ppb | 78 | 60 | 51 | 42 | 20 | 12 | 13 | 12 | 8.3 | 130.2 |
| 2 ppb | 120 | 87 | 72 | 52 | 16 | 13 | 11 | 17 | 8.7 | 15.1 |
| 3 ppb | 137 | 99 | 82 | 57 | 12 | 9 | 8 | 17 | 9.0 | 8.0 |
| Sample 3 | | | | | | | | | | |
| 1 ppb | 75 | 46 | 36.5 | 27 | 12 | 7 | 10 | 11 | 8.5 | 96.8 |
| 2 ppb | 95 | 66 | 51.5 | 33.5 | 11 | 9 | 8 | 13 | 8.3 | 11.8 |
| 3 ppb | 102 | 72 | 57 | 38 | 11 | 9 | 7 | 12 | 8.5 | 5.0 |
| Sample 2 | | | | | | | | | | |
| 1 ppb | 54 | 40 | 34 | 27 | 13 | 11 | 10 | 10 | 8.3 | 116.4 |
| 2 ppb | 73 | 47 | 37 | 26 | 8.5 | 7 | 7 | 11 | 8.3 | 11.9 |
| 3 ppb | 87.5 | 56 | 43.5 | 29 | 7 | 5.5 | 5 | 8 | 8.2 | 6.8 |

From the rheological data given in each of Tables 3A and 3B, above, it may also be observed that the addition of the terpolymer filtration control agent of the present invention did not adversely affect the rheological properties of the drilling fluid, and each sample had satisfactory rheology properties at the given readings.

EXAMPLE IV

Nineteen terpolymer samples containing various mole percents of sodium acrylate, 2-hydroxypropyl acrylate and acrylamide were prepared for evaluation as filtration control agents. The procedure utilized to prepare the samples was as in Example I, above. The monomers and about 70 to 75 grams of water were mixed and the acrylic acid was neutralized to about pH 7 with 5 M sodium hydroxide. The temperature of the solution was kept below 30° C. with the aid of an ice water bath. The monomers in solution and one-half of the initiator-amonium persulfate were added over a one-hour period to the mixture of water, one-half of the initiator and about 10% of the solution of monomers. The temperature of the reaction was maintained at about 60° C. for a total reaction time of three hours. The terpolymerwater mixture was broken into small samples, added to 1 liter of isopropyl alcohol, and allowed to stand for several hours. The solvent was decanted and the residue was dried at 90° C. for about 24 hours, followed by drying in a vacuum oven at 90° C. for another 24 hours or to a constant weight. The samples were milled to pass through a 30 mesh screen. In all cases, the product yield was quantitative.

The various terpolymers composed of varying mole percents of sodium acrylate, 2-hydroxypropyl acrylate and acrylamide were prepared using the quantities of monomers, initiator and water given in the table below. The product yield was quantitative.

The reactants utilized in the preparation of the terpolymer samples are set forth in the table below:

TABLE 4
MONOMERS AND INITIATOR CONCENTRATIONS OF TERPOLYMER PREPARATIONS

| Sample No. | (1) | (2) | (3) | (4) |
|---|---|---|---|---|
| 7 N* | 25.6 | 6.3 | 68.1 | |

TABLE 4-continued
MONOMERS AND INITIATOR CONCENTRATIONS OF TERPOLYMER PREPARATIONS

| Sample No. | | (1) | (2) | (3) | (4) |
|---|---|---|---|---|---|
| | M* | 0.375 | 0.092 | 1.000 | 3.51 |
| 8 | N | 16.1 | 19.8 | 64.1 | |
| | M | 0.249 | 0.308 | 0.995 | 3.49 |
| 9 | N | 16.0 | 3.9 | 80.1 | |
| | M | 0.333 | 0.082 | 1.667 | 3.51 |
| 10 | N | 24.0 | 4.0 | 72.0 | |
| | M | 0.750 | 0.124 | 2.251 | 0.88 |
| 11 | N | 22.2 | 3.6 | 74.1 | |
| | M | 0.500 | 0.082 | 1.667 | 1.75 |
| 12 | N | 24.0 | 4.0 | 72.0 | |
| | M | 0.750 | 0.124 | 2.251 | 1.75 |
| 13 | N | 8.0 | 4.0 | 88.0 | |
| | M | 0.250 | 0.124 | 2.750 | 1.75 |
| 14 | N | 8.0 | 27.8 | 64.2 | |
| | M | 0.116 | 0.404 | 0.931 | 3.27 |
| 15 | N | 30 | 4.0 | 66.0 | |
| | M | 0.627 | 0.083 | 1.378 | 5.86 |
| 19 | N | 0 | 0 | 100.0 | |
| | M | 0 | 0 | 1.352 | 3.51 |
| 20 | N | 10.0 | 15.0 | 75.0 | |
| | M | 0.200 | 0.299 | 1.498 | 1.75 |
| 21 | N | 10.0 | 25.0 | 65.0 | |
| | M | 0.231 | 0.575 | 1.494 | 1.75 |
| 22 | N | 5.0 | 14.9 | 80.1 | |
| | M | 0.093 | 0.275 | 1.482 | 1.73 |
| 23 | N | 6.1 | 2.9 | 91.0 | |
| | M | 0.142 | 0.069 | 2.132 | 1.75 |
| 24 | N | 15.0 | 40.0 | 45.0 | |
| | M | 0.267 | 0.713 | 0.802 | 1.75 |
| 25 | N | 12.9 | 2.6 | 84.5 | |
| | M | 0.306 | 0.062 | 2.001 | 1.75 |

* N mole %, M mole/kg
1 sodium acrylate
2 2-hydroxypropyl acrylate
3 acrylamide
4 ammonium persulfate

EXAMPLE V.

The present Example demonstrates the effectiveness of the present terpolymer composition to provide effective filtration control at increased temperatures. For this test, selected samples made as in Example I and Example IV were utilized in a mud system comprised of 17½ pounds of Wyoming Bentonite to which was added 1 p.p.b. of gypsum, 2 p.p.b. sodium chloride and 2 p.p.b. of chrome lignosulfonate. The initial mud system was adjusted to a pH of about 9.5 with sodium hydroxide. The selected samples of the terpolymer were added to aliquots of the base mud in concentrations of ½ p.p.b. and 1 p.p.b. The samples were hot rolled at 150° F. for 16 hours, and were permitted to cool to room temperature prior to rheological measurements being made and API filtrate being established for each sample. Thereafter, the sample containing 1 p.p.b. polymer was hot rolled in a 300° F. oven for a period of 3 hours and permitted to cool to room temperature before rheological data and API filtrate volumes were measured. Samples of the base mud treated with P.A.C. together with a base mud treated with another commercially available filtration control agent identified as a sodium polyacrylate, (hereinafter referred to as "S.P.A.") also were prepared and tested, as above, for comparative purposes. This test clearly indicated that the terpolymer of the present invention is an effective filtration control agent even after exposure to increased temperatures as high as about 300° F. Additionally, this test also indicates that the terpolymer of the present invention will not affect rheological properties of the drilling fluid. The results of this test are further illustrated in the following table:

TABLE 5
FLOW PROPERTIES AND API FILTRATE OF TERPOLYMER TREATED MUD BEFORE AND AFTER HOT-ROLLING AT 300° F.

| lb/bbl | Sample | Hot-Rolled | Fann Rheology, Rm Temp. 600 | 300 | 200 | 100 | 6 | 3 | 1G | 10G | pH | API Filtrate, ml |
|---|---|---|---|---|---|---|---|---|---|---|---|---|
| 1.0 | 13 | 150° F. | 62 | 35 | 26 | 16 | 3 | 2.5 | 3 | 10 | 9.2 | 6.1 |
| 1.0 | | 300° F. | 48 | 30 | 24 | 16 | 3 | 2 | 2 | 3 | 9.1 | 6.1 |
| 1.0 | | 150° F. | 69 | 40 | 30 | 20 | 5 | 4 | 4 | 23 | 9.0 | 4.8 |
| 1.0 | | 300° F. | 53 | 33 | 25 | 15 | — | 2 | 4 | 5 | 9.4 | 6.2 |
| 1.0 | | 150° F. | 36 | 20 | 15 | 9 | 1.5 | 1 | 2 | 3 | — | 4.8 |
| 1.0 | | 300° F. | 71 | 46 | 38 | 25 | 4 | 3 | 3 | 60 | 9.6 | 5.9 |
| 1.0 | 8 | 150° F. | 66 | 39 | 29 | 18.5 | 3.5 | 2.5 | 3 | 7 | 8.9 | 6.2 |
| 1.0 | | 300° F. | 64 | 37 | 27.5 | 17 | 3 | 2 | 3 | 3 | 9.5 | 8.6 |
| 0.5 | 20 | 150° F. | 36 | 21 | 16.5 | 9.5 | 2 | 1.5 | 1.5 | 2 | 9.2 | 8.2 |
| 1.0 | | 150° F. | 44 | 25 | 19 | 10 | 2 | 1.5 | 1.5 | 2 | 9.0 | 6.4 |
| 1.0 | | 300° F. | 52 | 30 | 22 | 13.5 | 2.5 | 2 | 2 | 2 | 8.3 | 8.1 |
| 0.5 | 22 | 150° F. | 24 | 13.5 | 10 | 6 | 1.5 | 1 | 2 | 2 | 9.0 | 10.4 |
| 1.0 | | 150° F. | 42 | 24 | 17 | 10 | 2 | 1.5 | 2 | 3 | 9.0 | 7.2 |
| 1.0 | | 300° F. | 57 | 32.5 | 23 | 13.5 | 2 | 1.5 | 1.5 | 2 | 8.4 | 10 |
| 0.5 | 23 | 150° F. | 19 | 11 | 8 | 5 | 1 | 1 | 1 | 1.5 | 9.2 | 7.4 |
| 1.0 | | 150° F. | 25 | 14 | 16.5 | 6.5 | 1.5 | 1 | 1 | 2 | 9.2 | 5.8 |
| 1.0 | | 300° F. | 39 | 23.5 | 18 | 11 | 2.5 | 2 | 2 | 3 | 8.6 | 6.5 |
| 0.5 | 24 | 150° F. | 43 | 25 | 19 | 12 | 2.5 | 2 | 2 | 6 | 8.9 | 8.2 |
| 1.0 | | 150° C. | 53 | 31 | 23 | 14 | 2.5 | 2 | 2 | 6 | 8.7 | 8.8 |
| 1.0 | | 300° F. | 72 | 43 | 32 | 19 | 3.5 | 2.5 | 2.5 | 3 | 8.1 | 10.0 |
| 0.5 | 25 | 150° F. | 19.5 | 11 | 8 | 5 | 1 | 1 | 1 | 11 | 9.1 | 9.0 |
| 1.0 | | 150° F. | 26 | 15 | 11 | 6.5 | 1.5 | 1 | 1.5 | 2 | 9.3 | 6.4 |
| 1.0 | | 300° F. | 42 | 25 | 18.5 | 11.5 | 2.5 | 2 | 2 | 2 | 8.4 | 6.5 |
| 1.0 | 7 | 150° F. | 28 | 15.5 | 11.5 | 7 | 1 | 1 | 1 | 2 | 8.9 | 8.6 |
| 1.0 | | 300° F. | 26.5 | 14.5 | 10.5 | 6 | 1 | 1 | 1 | 1 | 8.1 | 12.6 |
| 1.0 | 19 | 150° F. | 37 | 33.5 | 18 | 11.5 | 2.5 | 2 | 3 | 8 | 9.2 | 37.8 |
| 1.0 | | 300° F. | 13.5 | 7.5 | 6 | 3.5 | 1 | 1 | 1 | 1 | 8.2 | 38.0 |
| 1.0 | | 150° F. | <300 | 295 | 200 | 20 | 13 | 10 | 13 | 25 | — | 14.6 |
| 1.0 | | 300° F. | 29 | 16 | 12 | 7 | 1.5 | 1 | 1 | 2 | 8.9 | 9.0 |
| 0.25 | P.A.C. | 150° F. | 25 | 14.5 | 11 | 6.5 | 1.5 | 1 | 2 | 3 | 8.6 | 10.8 |
| 0.25 | | 150° F. | 20 | 12 | 8.5 | 5 | 1.5 | 1 | 4 | 2 | 9.2 | 13.6 |
| 0.5 | | 150° F. | 35 | 21 | 15.5 | 10 | 2 | 2 | 2 | 7 | 8.9 | 8.4 |
| 0.5 | | 150° F. | 26.5 | 15 | 11 | 7 | 1.5 | 1 | 3 | 2 | 8.8 | 10.8 |
| 1.0 | | 150° F. | 49 | 30.5 | 24 | 15.5 | 4 | 3.5 | 4 | 22 | 8.7 | 5.4 |

TABLE 5-continued

FLOW PROPERTIES AND API FILTRATE OF TERPOLYMER TREATED MUD BEFORE AND AFTER HOT-ROLLING AT 300° F.

| lb/bbl | Sample | Hot-Rolled | Fann Rheology, Rm Temp. | | | | | | | | pH | API Filtrate, ml |
|---|---|---|---|---|---|---|---|---|---|---|---|---|
| | | | 600 | 300 | 200 | 100 | 6 | 3 | 1G | 10G | | |
| 1.0 | | 300° F. | 47 | 29 | 22 | 14 | 3.5 | 3 | 4 | 13 | 9.4 | 9.0 |
| 1.0 | | 150° F. | 43.5 | 26.5 | 20 | 13 | 3 | 2 | 4 | 12 | 9.2 | 6.6 |
| 1.0 | | 300° F. | 31 | 19 | 14 | 9 | 2 | 1.5 | 3 | 7 | 9.3 | 9.7 |
| 0.25 | 3 | 150° F. | 68 | 45 | 35 | 23 | 14 | 14 | 5 | 63 | — | 12.8 |
| 0.5 | | 150° F. | 59 | 37 | 28 | 17 | 2.5 | 2 | 2 | 35 | 8.7 | 7.6 |
| 1.0 | | 150° F. | 59 | 37 | 29 | 19 | 3 | 2 | 2 | 8 | 8.7 | 5.2 |
| 1.0 | | 300° F. | 61 | 35 | 25 | 15 | 2 | 1.5 | 2 | 2 | 9.3 | 13.0 |
| 0.25 | 14 | 150° F. | 44 | 29 | 23 | 15 | 3 | 2 | 2 | 55 | 8.8 | 11.0 |
| 0.5 | | 150° F. | 73 | 43 | 33 | 20 | 5 | 4 | 4 | 38 | 8.4 | 9.6 |
| 1.0 | | 150° F. | 93 | 58 | 45 | 29 | 6 | 5 | 6 | 49 | 8.6 | 6.8 |
| 1.0 | | 300° F. | 82 | 52.5 | 41 | 27 | 4.5 | 3 | 4 | 5 | 9.4 | 14.6 |
| 0.25 | S.P.A. | 150° F. | 93 | 59 | 48 | 33.5 | 20 | 19.5 | 19.5 | 68 | 9.1 | 22.0 |
| 0.5 | | 150° F. | 76 | 43 | 32 | 18 | 3 | 2 | 3 | 3 | 9.0 | 15.2 |
| 1.0 | | 150° F. | 85 | 48 | 35 | 20 | 3 | 2 | 2 | 4 | 9.2 | 9.0 |
| 1.0 | | 300° F. | 169 | 119 | 95 | 64 | 13 | 8.5 | 9 | — | 9.4 | 20.6 |
| 1.0 | | 150° F. | 49 | 28 | 20 | 12 | 2 | 1.5 | 1.5 | 2 | 9.6 | 9.0 |
| 1.0 | | 300° F. | 69.5 | 41.5 | 31.5 | 18.5 | 2.5 | 1.5 | 1.5 | 2 | 8.8 | 16.4 |
| 0.5 | 11 | 150° F. | 61 | 38 | 28.5 | 17 | 3 | 2 | 2 | 21 | 9.2 | 6.8 |
| 1.0 | | 150° F. | 80 | 60 | 45 | 30 | 7 | 6 | 5 | 47 | 9.2 | 5.4 |
| 1.0 | | 300° F. | 78.5 | 45 | 35 | 21 | 3.5 | 3.5 | 4 | 8 | 9.0 | 6.6 |
| 1.0 | | 150° F. | 77 | 49 | 38 | 26 | 4 | 3 | 3 | 55 | 9.2 | 4.8 |
| 1.0 | | 300° F. | 72 | 42 | 30 | 18 | — | 2 | 3 | 5 | 9.3 | 7.9 |
| 0.5 | 12 | 150° F. | 80 | 51 | 39 | 25 | 6 | 5 | 3 | 47 | 9.0 | 7.0 |
| 1.0 | | 150° F. | 88 | 62 | 49 | 40 | 18 | 14 | 12 | 95 | 9.3 | 5.0 |
| 1.0 | | 300° F. | 80 | 50 | 38 | 23 | 4 | 3 | 4 | 6 | 9.0 | 6.7 |
| 0.5 | 15 | 150° F. | 49 | 31 | 23 | 14 | 2 | 1.5 | 2 | 13 | 9.2 | 7.2 |
| 1.0 | | 150° F. | 52 | 31 | 23 | 13.5 | 2 | 1.5 | 2 | 3 | 9.1 | 6.6 |
| 1.0 | | 300° F. | 59 | 34 | 25 | 14.5 | 2 | 2 | 2 | 3 | 9.3 | 9.3 |
| 0.5 | 10 | 150° F. | 68 | 42 | 33 | 21 | 7 | 6 | 5 | 40 | 9.2 | 8.8 |
| 1.0 | | 150° F. | 97 | 65 | 53 | 39 | 20 | 18 | 19 | 51 | 9.3 | 5.0 |
| 1.0 | | 150° F. | 87 | 58 | 47 | 34 | 11 | 9 | 7 | 103 | 9.4 | 4.8 |
| 1.0 | | 300° F. | 115 | 66 | 47 | 26 | 4 | 3 | 3 | 4 | 8.9 | 8.2 |
| 1.0 | | 150° F. | 86 | 54 | 43 | 37 | 5 | 4 | 4 | 66 | 8.9 | 5.0 |
| 1.0 | | 300° F. | 115 | 67 | 53 | 30 | — | 3 | 4 | 4 | 9.0 | 8.6 |
| 0.25 | 4 | 150° F. | 174 | 146 | 135 | 111 | 70 | 61 | 54 | 55 | 9.2 | 19.8 |
| 0.5 | | 150° F. | 88 | 49 | 35 | 20 | 3 | 2 | 2 | 4 | 9.0 | 14.6 |
| 1.0 | | 150° F. | 64 | 38 | 28 | 17 | 2 | 1.5 | 2 | 3 | 9.1 | 7.2 |
| 1.0 | | 300° F. | 125 | 86 | 69 | 47 | 10 | 7 | 9 | 17 | — | 19.3 |
| 0.25 | 1 | 150° F. | 92 | 67 | 55 | 44 | 33 | 32.5 | 34 | 70 | 9.1 | 21.6 |
| 0.5 | | 150° F. | 57 | 34 | 25 | 15 | 2.5 | 2 | 4 | 6 | 9.2 | 14.8 |
| 1.0 | | 150° F. | 44 | 24 | 18.5 | 10 | 1.5 | 1 | 2 | 2 | 9.3 | 7.2 |
| 1.0 | | 300° F. | 139 | 96 | 77 | 53 | 11 | 8 | 8.5 | 13 | 9.6 | 18.8 |
| 0.5 | 9 | 150° F. | 26 | 15 | 11.5 | 7 | 2.5 | 2 | 3 | 4 | 9.0 | 7.4 |
| 1.0 | | 150° F. | 35 | 20 | 15 | 9 | 2 | 1 | 2 | 3 | 9.1 | 5.2 |
| 1.0 | | 300° F. | 61 | 35 | 26 | 16 | 3 | 2.5 | 3 | 3 | 9.0 | 6.1 |
| 1.0 | | 150° F. | 39 | 23 | 17 | 10 | 2 | 1.5 | 1.5 | 2.5 | 9.2 | 5.4 |
| 1.0 | | 300° F. | 52 | 32 | 24.5 | 15 | 3 | 2 | 3 | 9 | 9.2 | 5.6 |
| | Base Mud | 150° F. | 18 | 9 | 6.5 | 3.5 | 1 | 1 | 1 | 1 | 9.3 | 16.4 |
| | | 300° F. | 20 | 10.6 | 7 | 4 | 1 | 0.5 | 1 | 1 | 9.0 | 20.6 |
| | | 150° F. | 21 | 11 | 7.5 | 4 | 1.5 | 1 | 1 | 1 | 9.7 | 20.8 |
| | | 300° F. | 26.5 | 14 | 9.5 | 5 | 1 | 0.5 | 1 | 1 | 9.7 | 21.4 |

EXAMPLE VI

The present Example demonstrates the ability of the terpolymer of the present invention to provide effective filtration control in an aqueous drilling fluid after being subjected to 300° F. over an extended period of time. For this test the base mud as in Example V, was utilized. To the base mud was added a 1 p.p.b. treatment of the samples identified in the Table below. The sample mud with the filtration control additive added thereto was first hot rolled for a period of 16 hours at a temperature of 150° F. Thereafter, each sample was permitted to cool to room temperature prior to measurements of rheological properties and API filtrate volumes. Thereafter, the initial hot rolled sample was broken into four separate test specimens, and each specimen was hot rolled in an oven at a temperature of 300° F. The first test specimen was hot rolled for a time period of 3 hours, the second for 5 hours, the third for 7 hours and the 4th for 16 hours. After the respective time period of hot rolling for each sample, the sample was permitted again to cool to room temperature prior to rheological measurement made and API filtrate being established. The same procedure was utilized to measure the rheology and API filtrate of a blank sample of the base mud.

The results of this test clearly indicated that the terpolymer of the present invention provided effective filtration control of the drilling fluid sample, even after exposure to a temperature of 300° F., over extended periods of time, up to 16 hours. Additionally, the present test indicates that the filtration control agent is more effective after exposure to a temperature of 300° F. than comparative samples of commercially available filtration control agents as described above.

The results of this test are further reflected in the Table below:

TABLE 6
EFFECT OF TIME AT 300° F. ON THE FLOW AND FILTRATION CHARACTERISTICS OF TERPOLYMER-TREATED MUD

| | Fann 35 Rheology, Rm Temp | | | | | | API | | |
|---|---|---|---|---|---|---|---|---|---|
| | 600 | 300 | 200 | 100 | 6 | 3 | 1G 10G | pH | Filtrate |
| 1 lb/bbl Sample 9 | | | | | | | | | |
| *HR 150° F., 16 Hrs | 39 | 23 | 17 | 10 | 2 | 1.5 | 1.5 2.5 | 9.2 | 5.4 |
| HR 300° F., 3 Hrs | 52 | 32 | 24.5 | 15 | 3 | 2 | 3 9 | 9.2 | 5.6 |
| 5 Hrs | 80 | 51 | 39 | 25 | 5.5 | 4 | 4 7 | 9.2 | 7.1 |
| 7 Hrs | 80 | 51 | 38 | 24 | 5 | 3.5 | 4 5 | 9.3 | 9.0 |
| 16 Hrs | 86 | 54 | 41 | 26 | 5 | 4 | 4 7 | 9.3 | 9.2 |
| 1 lb/bbl Sample 13 | | | | | | | | | |
| HR 150° F., 16 Hrs | 36 | 20 | 15 | 9 | 1.5 | 1 | 2 3 | — | 4.8 |
| HR 300° F., 3 Hrs | 71 | 46 | 38 | 25 | 4 | 3 | 3 60 | 9.6 | 5.9 |
| 5 Hrs | 102 | 65 | 49 | 31 | 7 | 5 | 6 15 | 9.3 | 7.0 |
| 7 Hrs | 54 | 33 | 24.5 | 10.5 | 3.5 | 2.5 | 2.5 3 | 8.7 | 6.6 |
| 16 Hrs | 48 | 29 | 22 | 14 | 2.5 | 2 | 2.5 3 | 9.0 | 8.0 |
| 1 lb/bbl P.A.C. | | | | | | | | | |
| HR 150° F., 16 Hrs | 55 | 33.5 | 25.5 | 16.5 | 5 | 4 | 4 16 | 9.5 | 5.8 |
| HR 300° F., 3 Hrs | 51 | 33 | 26 | 17 | 7 | 5.5 | 7 22 | 9.4 | 7.8 |
| 5 Hrs | 40 | 26 | 20 | 14 | 4 | 4 | 5 17 | 9.2 | 10.5 |
| 7 Hrs | 39 | 24 | 18 | 11.5 | 3 | 2.5 | 3 11 | 9.8 | 10.4 |
| 16 Hrs | 34.5 | 19.5 | 14.5 | 8.5 | 2 | 1 | 2 4 | 9.2 | 13.6 |
| Base Mud | | | | | | | | | |
| HR 150° F., 16 Hrs | 21 | 11 | 7.5 | 4 | 1.5 | 1 | 1 1 | 9.7 | 20.8 |
| HR 300° F., 3 Hrs | 26.5 | 14 | 9.5 | 5 | 1 | 0.5 | 1 1 | 9.7 | 21.4 |
| 5 Hrs | 22 | 12 | 8.5 | 5 | 1.5 | 1 | 1 2 | 8.0 | 22.8 |
| 7 Hrs | 18 | 9.5 | 7 | 4 | 1.5 | 1 | 1 1 | 8.0 | 21.6 |
| 16 Hrs | 32 | 17 | 12 | 6.5 | 1 | 0.5 | 1 2 | 9.3 | 23.2 |
| 1 lb/bbl S.P.A. | | | | | | | | | |
| HR 150° F., 16 Hrs | 49 | 28 | 20 | 12 | 2 | 1.5 | 1.5 2 | 9.6 | 9.0 |
| HR 300° F., 3 Hrs | 69.5 | 41.5 | 31.5 | 18.5 | 2.5 | 1.5 | 1.5 2 | 8.8 | 16.4 |
| 5 Hrs | 85 | 53 | 40 | 24.5 | 3.5 | 2.5 | 2.5 — | — | 20.2 |
| 7 Hrs | 79 | 48.5 | 36.5 | 22 | 3 | 2 | 2 6 | 9.4 | 19.2 |
| 16 Hrs | 95.5 | 58.5 | 43.5 | 26.5 | 4 | 3 | 3 6 | 8.4 | 22.8 |

*hot rolled

EXAMPLE VII

Tests were run and results were evaluated to determine the approximate viscosity of the terpolymer of the present invention. A 0.2% weight solution of selected terpolymer sample was prepared by gradually adding 0.60 grams, dry weight basis, of the sample to 300 grams of deionized water. The solution was moderately sheared for 30 minutes at room temperature, (about 25° C.) using an electric mixer, and thereafter allowed to stand at room temperature (about 25° C.) for 16 hours. The solution was then agitated with a spatula, and viscosity, in centipoises, determined at a shear rate of 511 reciprocal seconds, as determined by using a Fann Model 35 viscometer with bob and rotor R1B1. Centipoises reading was calculated as follows:

$$cps = \frac{\text{shear stress}}{\text{shear rate}} = \frac{\text{dial reading} \times \text{spring factor} \times 5.077}{511} \times 100$$

spring factor = 1

Table VII, below, shows the results of these tests.

TABLE VII

| Sample No. | Composition, Mode % | | | Viscosity, cps |
|---|---|---|---|---|
| | A | B | C | |
| 8 | 16.1 | 19.8 | 64.1 | 62 |
| 9 | 16.0 | 3.9 | 80.1 | 27 |
| 12 | 24.0 | 4.0 | 72.0 | 85 |
| 13 | 8.0 | 4.0 | 88.0 | 25 |
| 14 | 8.0 | 27.8 | 64.2 | 6 |
| 15 | 30.0 | 4.0 | 66.0 | 25 |
| 22 | 5.0 | 14.9 | 80.1 | 6 |

A = sodium acrylate
B = 2-hydroxypropyl acrylate
C = acrylamide

Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. An aqueous solution of a terpolymer filtration control agent for aqueous based drilling fluids having clayey material therein, said terpolymer consisting essentially of (1) from about 5 to about 62 mole percent of alkali metal acrylate units, (2) from about 2 to about 40 mole percent of hydroxyalkyl acrylate units selected from 2-hydroxyethyl acrylate, 2-hydroxypropyl acrylate and 2-hydroxybutyl acrylate units, and (3) from about 31 to about 91 mole percent of acrylamide units; a 0.2% by weight aqueous solution of said terpolymer having a viscosity at about 25° C. of from about 6 centipoises to about 85 centipoises, as determined at a shear rate of 511 reciprocal seconds.

2. The filtration control agent of claim 1 wherein the amount of said alkali metal acrylate units utilized in said terpolymer is from about 10 to about 30 mole percent.

3. The filtration control agent of claim 1 wherein the amount of said hydroxyalkyl acrylate units is about 4.0 mole percent.

4. The filtration control agent of claim 1 wherein the amount of said acrylamide units utilized in said terpolymer is about 70 mole percent.

5. The filtration control agent of claim 1 wherein the amount of said alkali metal acrylate units is about 23 mole percent; the amount of said hydroxyalkyl acrylate units is about 4.0 percent; and the amount of said acrylamide units is about 73 mole percent.

6. The filtration control agent of claim 1 wherein said hydroxyalkyl acrylate is 2-hydroxypropyl acrylate.

7. The filtration control agent of claim 1 wherein said alkali metal acrylate units are sodium acrylate units.

8. The filtration control agent of claim 1, wherein said alkali metal acrylate units are sodium acrylate units in an amount of about 23 mole percent; said hydroxyalkyl acrylate units are 2-hydroxypropyl acrylate units in an amount of about 4.0 mole percent; and said acrylamide units are present in said terpolymer in an amount of about 73 mole percent.

* * * * *